US008234463B2

United States Patent
Ikeuchi et al.

(10) Patent No.: US 8,234,463 B2
(45) Date of Patent: Jul. 31, 2012

(54) DATA PROCESSING APPARATUS, MEMORY CONTROLLER, AND ACCESS CONTROL METHOD OF MEMORY CONTROLLER

(75) Inventors: Toru Ikeuchi, Kanagawa (JP); Yukihiko Akaike, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 402 days.

(21) Appl. No.: 12/453,874

(22) Filed: May 26, 2009

(65) Prior Publication Data
US 2009/0300297 A1    Dec. 3, 2009

(30) Foreign Application Priority Data
May 30, 2008    (JP) .................. 2008-143182

(51) Int. Cl.
G06F 12/00 (2006.01)
G06F 11/16 (2006.01)
G06F 11/00 (2006.01)

(52) U.S. Cl. ................ 711/155; 711/154; 711/E12.001; 714/799; 714/E11.056

(58) Field of Classification Search .................. 711/155, 711/154
See application file for complete search history.

(56) References Cited

U.S. PATENT DOCUMENTS
2006/0036817 A1*  2/2006  Oza et al. ................. 711/155
2007/0186135 A1*  8/2007  Flachs et al. .............. 714/752
2007/0234182 A1* 10/2007  Wickeraad et al. ........ 714/763

FOREIGN PATENT DOCUMENTS
JP    11-194975    7/1999
* cited by examiner

Primary Examiner — Huan Hoang
Assistant Examiner — Tri Hoang
(74) Attorney, Agent, or Firm — McGinn IP Law Group, PLLC (57) ABSTRACT

A data processing apparatus includes a memory which receives and outputs data with a predetermined data width, an operation circuit which outputs a read command or a write command to access the memory, and an access control circuit which replaces a part of first read data read from the memory with a partial data, and outputs partially replaced data as write data to the memory when receiving the write command and the partial data with a data width smaller than the predetermined data width associated with the write command, from the operation circuit. The access control circuit replaces a part of second read data which has been acquired in response to the read command outputted before, instead of the first read data, with the partial data, and outputs replaced partially data as the write data if the write command has been outputted in connection with a read command outputted before the write command.

20 Claims, 8 Drawing Sheets

DATA PROCESSING APPARATUS, MEMORY CONTROLLER, AND ACCESS CONTROL METHOD OF MEMORY CONTROLLER

INCORPORATION BY REFERENCE

This application is based upon and claims the benefit of priority from Japanese Patent Application No. 2008-143182 which was filed on May 30, 2008, the disclosure of which is incorporated herein in its entirety by reference.

BACKGROUND OF THE INVENTION

1. Field of the Invention

The present invention relates to a data processing apparatus, a memory controller and an access control method of the memory controller, and in particular to a data processing apparatus provided with an operation circuit and a memory which receives access from the operation circuit, wherein the memory stores write data outputted from the operation circuit and an error correcting code corresponding to the write data in association with each other.

2. Description of Related Art

A data processing apparatus has an operation circuit (for example, a Central Processing Unit: CPU) and a memory which is accessed by the CPU. The CPU executes various processings by accessing the memory. In recent semiconductor devices, miniaturization of semiconductor elements has progressed, and the capacity of the memory has increased. However, as the capacity of the memory increases, the rate of occurrence of element defects during the manufacturing process or during the duration of use increases. If a defective element occurs in the memory, then it is not possible to hold accurate data. There is a problem that, when the CPU operates on the basis of such inaccurate data, a malfunction occurs in the data processing apparatus.

Therefore, an error correcting code (ECC) is added to data to be stored into the memory, and the error correcting code is read from the memory together with the data to perform error correction of the data. By performing such error correction, it is possible to, even if the memory includes a certain number of element defects, treat the memory similarly to a memory without an element defect.

The CPU and the memory are generally connected via a data bus having a predetermined bus width. The CPU transmits and receives data with a data width within the range of the bus width, to and from the memory. For example, if the bus width is 32 bits, the maximum data width of data which the CPU can transmit and receive to and from the memory is 32 bits (hereinafter, the data width of 32 bits is referred to as "1 word"). However, the CPU does not necessarily perform transmission and receiving of data with the memory on a word basis. Indeed, it may perform transmission and receiving of data with the memory on a half word (data whose data width is 16 bits) basis or on a byte (data whose data width is 8 bits) basis according to a program to be executed.

In order to perform error correction using an error correcting code in such a data processing apparatus, the error correcting code is generated for each of the minimum unit of data transmitted and received. However, when the error correcting code is generated for the minimum unit of data, there is a problem that, since the percentage of occupation of the memory storage capacity by error correcting codes increases, the memory storage capacity cannot be effectively used. For example, the error correcting code for 8-bit data has a data width of 5 bits. In this case, about 40% of the memory storage capacity is used for the error correcting codes. In comparison, if the error correcting code is generated for each 1 word, then the data width of the error correcting code is 7 bits. That is, the amount of data can be suppressed more by generating the error correcting code for a larger unit of data.

Figure 7:
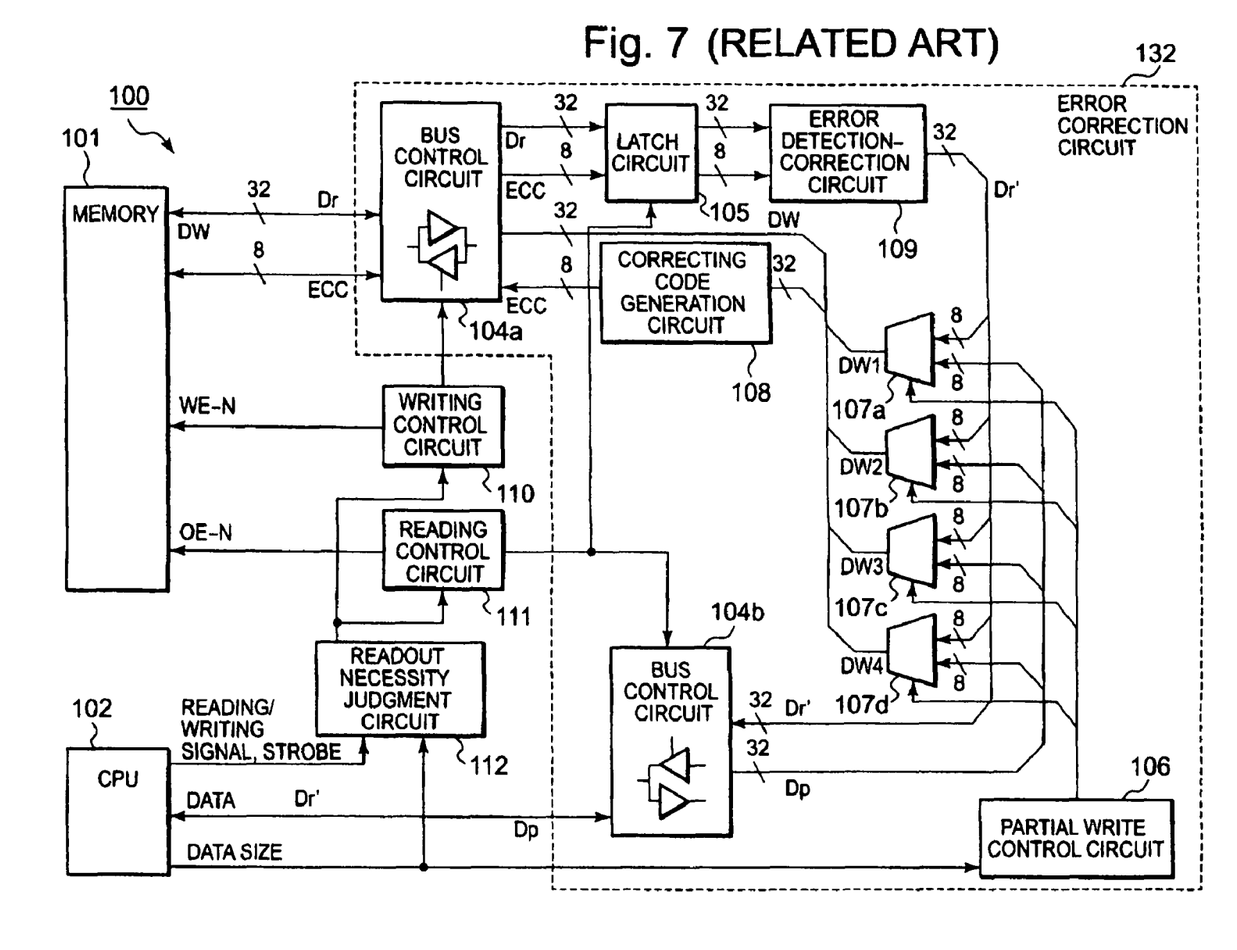
FIG. 7 is a block diagram of a data processing apparatus of JP-A-HEI-11-194975.

Accordingly, JP-A-HEI-11-194975 discloses a memory system 100 which generates the error correcting code for each 1 word irrespective of the data width of data transmitted and received between the CPU and the memory. FIG. 7 shows the block diagram of the memory system 100. As shown in FIG. 7, the memory system 100 has a memory 101, a CPU 102, a writing control circuit 110, a reading control circuit 111, a readout necessity judgment circuit 112 and an error correction circuit 132. The error correction circuit 132 has bus control circuits 104a and 104b, a latch circuit 105, a partial write control circuit 106, selectors 107a to 107d, a correcting code generation circuit 108, and an error detection-correction circuit 109. In the memory system 100, the CPU 102 and the memory 101 are connected via a bus with a data width of 32 bits. That is, the CPU 102 and the memory 101 assume 32 bits as 1 word.

Figure 8:
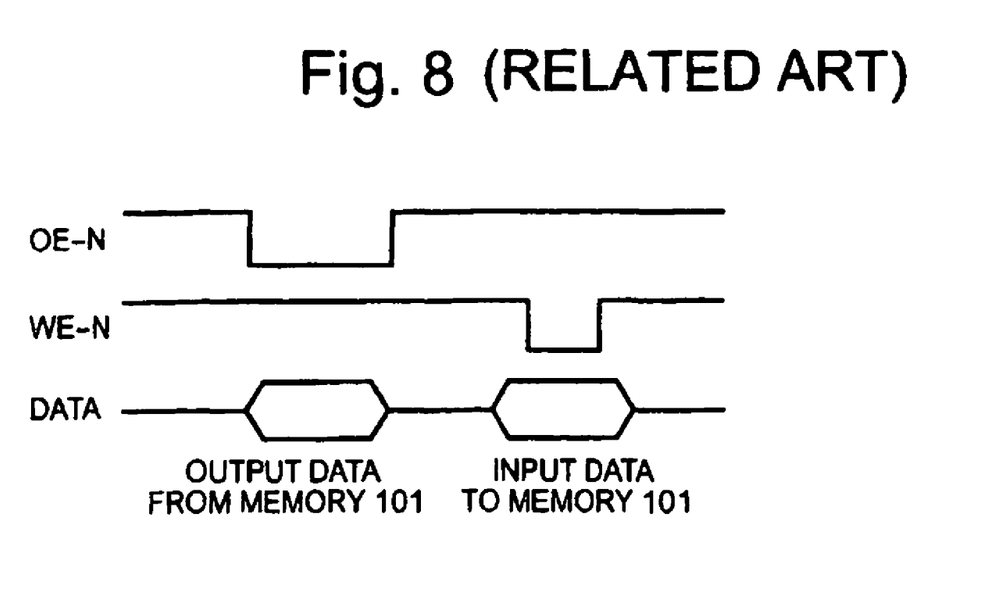
FIG. 8 is a timing chart in the case where a write operation for partial data is performed in the data processing apparatus of JP-A-HEI-11-194975.

FIG. 8 shows a timing chart showing the operation of the memory system 100 in the case where the memory system 100 writes data having a data width of 8 bits or 16 bits into the memory. As shown in FIG. 8, in the case of writing 8 bits or 16 bits, the readout necessity judgment circuit 112 instructs the reading control circuit 111 to output a reading signal OE-N on the basis of a data size signal first. On the basis of this reading signal OE-N, data to be stored is outputted from the memory 101. After that, a writing signal WE-N is outputted from the writing control circuit 110. Then, input data is written into the memory 101. That is, the memory system 100 reads data Dr and an error correcting code ECC from the memory 101 by the first reading operation, and generates data Dr' by the error detection-correction circuit 109. Then, by the next writing operation, the memory system 100 generates input data DW to be inputted into the memory 101 with data Dp (write data outputted from the CPU 102) to be inputted into a selector which has been selected by the partial write control circuit 106 and the data Dr' to be inputted into a selector which has not been selected by the partial write control circuit 106. Then, an error correcting code ECC is generated for this input data DW. After that, both of this error correcting code ECC and the input data DW are written into the memory 101.

Figure 9:
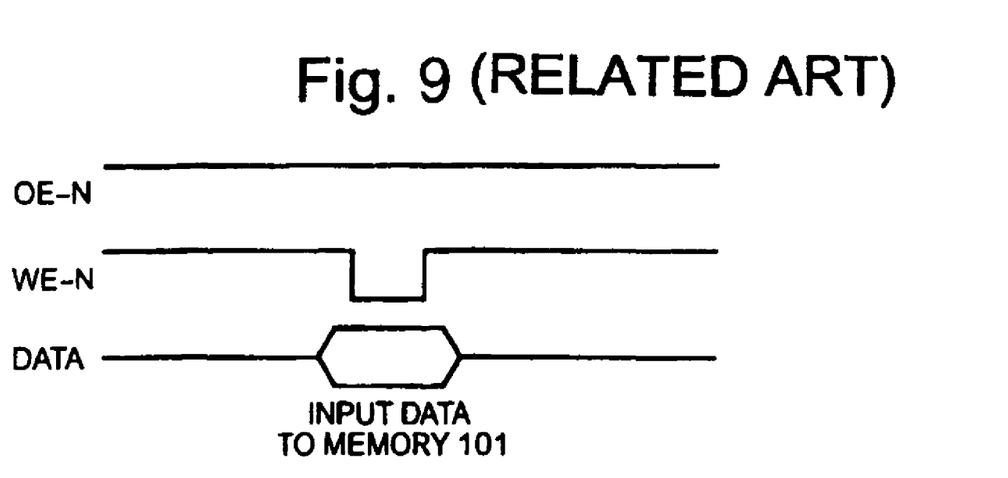
FIG. 9 is a timing chart in the case where a write operation for 1-word data is performed in the data processing apparatus of JP-A-HEI-11-194975.

On the other hand, FIG. 9 shows a timing chart showing the operation of the memory system 100 in the case of writing 1-word data into the memory 101. In the case of writing data with 1 word, the readout necessity judgment circuit 112 instructs the reading control circuit 111 not to output a reading signal OE-N. Then, when data Dp outputted from the CPU 102 reaches the bus control circuit 104a, the writing control circuit 110 outputs a writing signal WE-N. After that, the data Dp is written into the memory 101 as input data to the memory 101.

In the memory system 100, when the 1-word data is written, the data Dp outputted by the CPU 102 is written, without reading data from the memory 101 in advance. Thereby, the memory system 100 reduces access time required when the 1-word data is written.

SUMMARY

However, the present inventors have recognized the following point. Namely, a data processing apparatus, such as a microcomputer, may be implemented with a read-modify-write command for modifying data read from a memory and writing only the data of the modified part back to the memory.

In order to reduce the amount of the data of error correcting codes in a data processing apparatus implemented with this read-modify-write command, it is necessary to generate 1-word data which includes data (for example, data after correction) with a data width of 8 bits or 16 bits in a writing-back operation.

Now, it will be considered to apply the writing processing procedure of JP-A-HEI-11-194975 to a data processing apparatus implemented with the read-modify-write command. In this case, in the data processing apparatus, the writing-back operation corresponds to the operation of writing data with a data width of 8 bits or 16 bits in JP-A-HEI-11-194975. That is, in the writing-back operation under the read-modify-write command, a read operation for the writing-back operation is performed separately from a read operation executed before the writing-back operation, and, after that, writing of the data after correction into a memory is performed.

Therefore, there is a problem that, even if the writing procedure of JP-A-HEI-11-194975 is applied to the data processing apparatus implemented with the read-modify-write command, it is not possible to sufficiently shorten access time if the frequency of occurrence of the 1-word writing operation which can reduce the access time is low.

The present invention seeks to solve one or more of the above problems, or to improve upon those problems at least in part.

In one exemplary embodiment, a data processing apparatus includes a memory which receives and outputs data with a predetermined data width, an operation circuit which outputs a read command or a write command to access the memory, and an access control circuit which replaces a part of first read data read from the memory with a partial data, and outputs partially replaced data as write data to the memory when receiving the write command and the partial data with a data width smaller than the predetermined data width associated with the write command, from the operation circuit. The access control circuit replaces a part of second read data which has been acquired in response to the read command outputted before, instead of the first read data, with the partial data, and outputs partially replaced data as the write data if the write command has been outputted in connection with a read command outputted before the write command.

In another exemplary embodiment, a memory controller controls access to a memory when receiving a read command or a write command outputted from an operation circuit. The memory controller includes an access control circuit which outputs write data to the memory, based on read data acquired from the memory in response to the read command received immediately before the write command and partial data outputted from the operation circuit in response to the write command, when detecting that the write command is a command based on the read command received immediately before the write command.

In yet another exemplary embodiment, an access control method is for controlling access between an operation circuit and a memory which receives access from the operation circuit. The access control method includes transmitting read data read from the memory in response to a read command outputted from the operation circuit to the operation circuit, receiving a write command and data obtained by changing a part of the read data outputted from the operation circuit as partial data, detecting that the write command includes a command outputted in response to the read command outputted immediately before, and generating write data to the memory based on the read data read in response to the read command outputted immediately before the write command and the partial data.

Therefore, the data processing apparatus, the memory controller and the access control method of the memory controller according to the present invention are such that a write command outputted from the operation circuit is based on an immediately previously read command and are especially effective in the case of an instruction of writing partial data having a data width smaller than a predetermined data width. In such a case, write data to be stored into the memory is generated by replacing a part of read data which has been already acquired on the basis of the immediately previously read command with the partial data, without performing a reading operation of the memory, in the present invention. Due to such an operation, it is possible to, when performing an operation of writing partial data, generate write data having the same data width as read data and including the partial data, without performing a reading operation of the memory, in the data processing apparatus, memory controller and access control method of the memory controller according to the present invention.

According to the data processing apparatus, memory controller and access control method of the memory controller of the present invention, it is possible to, in an operation of writing partial data, shorten access time between an operation circuit and a memory while generating write data having the same data width as read data and including the partial data.

BRIEF DESCRIPTION OF THE DRAWINGS

The above and other purposes, advantages and features of the present invention will become more apparent from the following description of a certain exemplary embodiment taken in conjunction with the accompanying drawings in which.

DETAILED DESCRIPTION OF THE EXEMPLARY EMBODIMENTS

The invention will now be described herein with reference to an illustrative exemplary embodiment. Those skilled in the art will recognize that many alternative embodiments can be accomplished using the knowledge of the present invention, and that the invention is not limited to the exemplary embodiment illustrated for explanatory purposes.

Hereinafter, a first exemplary embodiment of the present invention will be described with reference to the accompanying drawings.

First Exemplary Embodiment

Figure 1:
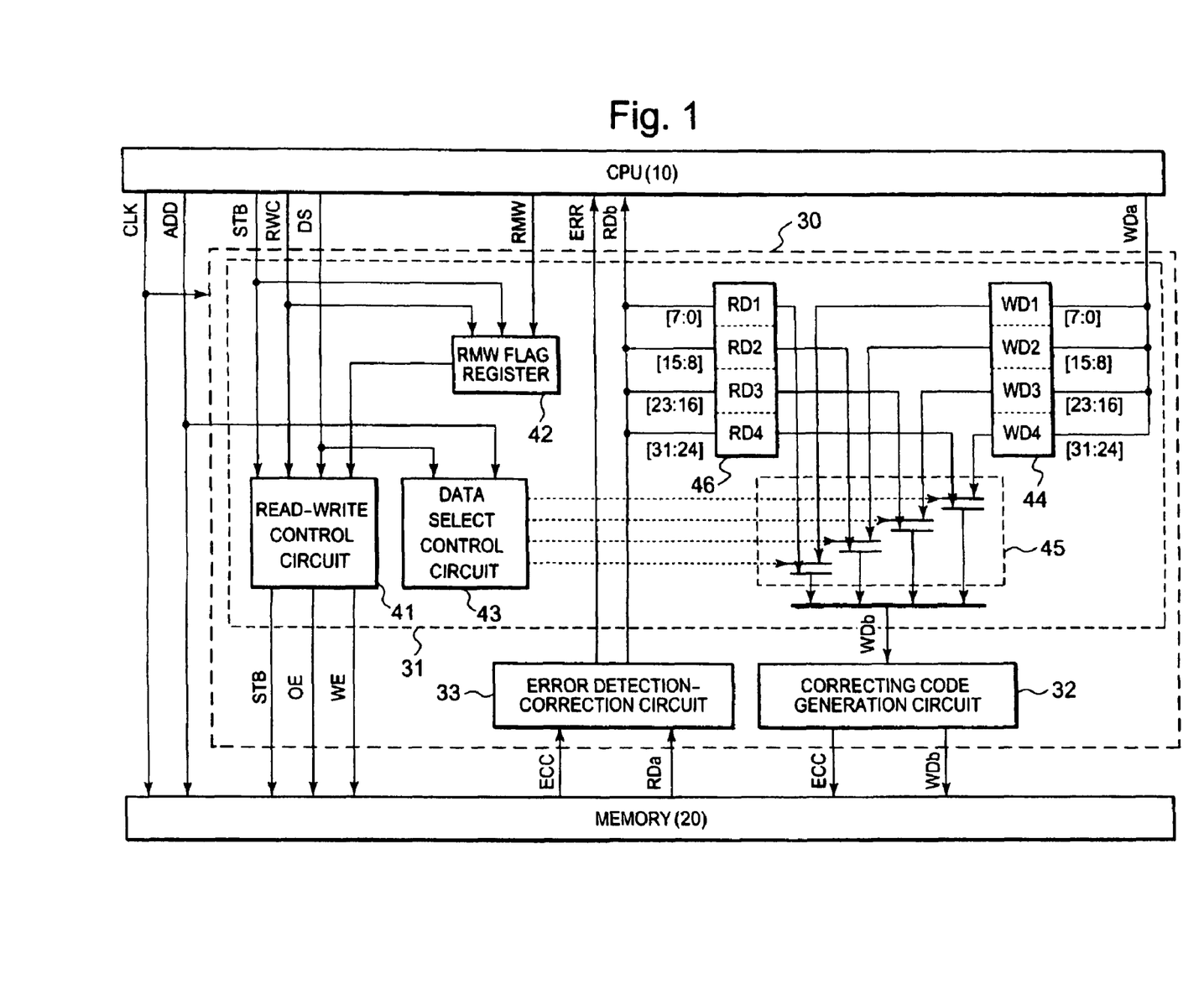
FIG. 1 is a block diagram of a data processing apparatus according to a first exemplary embodiment.

FIG. 1 shows a block diagram of a data processing apparatus according to this exemplary embodiment. As shown in FIG. 1, the data processing apparatus has an operation circuit (for example, a Central Processing Unit: CPU) 10, a memory 20 and a memory controller 30. In this exemplary embodiment, the CPU 10 and the memory 20 are connected via a data bus having a data width of 1 word (32 bits). The memory 20 is assumed to handle write data and read data to be inputted (e.g., received) and outputted, with a predetermined data width (for example, the same data width as the bus width of the data bus) as one control unit. On the other hand, the CPU 10 is assumed to output data to be stored (hereinafter referred to as "write data") which has a data width of 8 bits (a byte), 16 bits (a half word) or 32 bits (a word) according to an executed program. It is assumed that the memory controller 30 is provided between the CPU 10 and the memory 20 and controls access between the CPU 10 and the memory 20. Among the write data, such data having a data width smaller than the data width of the data bus is referred to as "partial data".

The CPU 10 reads a program from a storage device (not shown) and executes various programs according to the read program. The CPU 10 accesses the memory 20 according to the executed program. In the processing for accessing the memory 20, the CPU 10 transmits a clock signal CLK, an address signal ADD, a strobe signal STB, a read/write control signal RWC, a data size signal DS, a read-modify-write signal RMW and write data WDa, and receives read data RDb and an error signal ERR from the memory controller 30. The read/write control signal RWC is in a writing instruction state (for example, a low level) in the case where the CPU 10 gives (e.g., outputs) a write command to the memory 20, and is in a reading instruction state (for example, a high level) in the case where the CPU 10 gives (e.g., outputs) a read command to the memory 20.

The CPU 10 is assumed to be implemented with a read-modify-write command. The read-modify-write command is a command generated according to a program executed in the CPU 10. When the read-modify-write command is executed, the CPU 10 performs a read operation first, reads data stored at a predetermined address, modifies the read data, and writes only the modified data back to the memory 20 by a writing operation. When the read-modify-write command is executed in the CPU 10, the CPU 10 accesses the same address in the read operation and the write operation. The data which the CPU 10 writes back to the memory 20 is data of only a part of the read data.

The memory 20 performs storage of write data WDb, and outputs read data RDa in response to a command from the CPU 10. In this case, the memory 20 stores an error correcting code ECC corresponding to the write data WDb, which the memory controller 30 has generated, in association with the write data WDb. Furthermore, when a reading instruction is given from the CPU 10, the memory 20 outputs an error correcting code ECC associated with the read data RDa, together with the read data RDa. The error correcting code ECC is assumed to be transmitted via a local bus connecting the memory controller 30 and the memory 20.

The memory controller 30 controls transmission and receiving of data performed between the CPU 10 and the memory 20, on the basis of the read read/write control signal RWC, the strobe signal, the data size signal DS and the read-modify-write signal RMW outputted by the CPU 10. The address signal ADD and the clock signal CLK outputted by the CPU 10 are given (e.g., provided) directly to the memory 20, not via the memory controller 30. The clock signal CLK outputted by the CPU 10 is also given to the memory controller 30, and the memory controller 30 operates, with the clock signal CLK as its operation clock. The memory controller 30 has an access control circuit 31, a correcting code generation circuit 32 and an error detection-correction circuit 33.

The correcting code generation circuit 32 receives the write data WDb from the access control circuit 31 and generates an error correcting code ECC corresponding to the received write data WDb. Then, the correcting code generation circuit 32 outputs the write data WDb and the error correcting code ECC to the memory 20. The error detection-correction circuit 33 reads the read data RDa and the error correcting code corresponding to the read data RDa from the memory 20. Then, the error detection-correction circuit 33 performs detection and correction of an error in the read data RDa on the basis of the error correcting code ECC. After that, the error detection-correction circuit 33 outputs the read data RDb after error correction to the CPU 10. In this case, if the read data RDa cannot be corrected by the error correcting code ECC, then the error detection-correction circuit 33 transmits an error signal ERR indicating an error occurrence state to the CPU 10 to notify that an uncorrectable error exists in the read data RDa.

Receiving the read/write control signal RWC from the CPU 10, the access control circuit 31 outputs a read control signal OE or a write control signal WE to the memory 20. The access control circuit 31 outputs the strobe signal STB received from the CPU 10, to the memory 20. The strobe signal STB outputted by the access control circuit 31 is a signal synchronized with the write data WDb and the error correcting code ECC outputted by the correcting code generation circuit 32. Furthermore, the access control circuit 31 outputs the write data WDa received from the CPU 10 to the correcting code generation circuit 32 as the write data WDb. Here, in the case where the CPU 10 has outputted 1-word write data WDa, the write data WDb is the same as the write data WDa. On the other hand, in the case where the CPU 10 has outputted 1-byte or 1-word write data WDa, the write data WDb is obtained by replacing a part of read data RDb which has been read before is replaced with the write data WDa. The memory controller 30 performs this replacement operation on the basis of the data size signal DS indicating the data width of the write data WDa. The access control circuit 31 will be described below in more detail.

The access control circuit 31 has a read-write control circuit 41, an RMW flag register 42, a data select control circuit 43, a write data buffer 44, a data merge circuit 45 and a read data buffer 46.

The read-write control circuit 41 converts the synchronization timing of the strobe signal STB outputted from the CPU 10 to a synchronization timing corresponding to the write data WDb outputted by the memory controller 30 and outputs it. The read-write control circuit 41 outputs a read control signal OE or a write control signal WE according to the read/write control signal RWC outputted from the CPU. If the read/write control signal RWC is in a reading instruction state, then the read-write control circuit 41 outputs a read control signal OE. On the other hand, if the read/write control signal RWC is in a writing instruction state, then the read-write control circuit 41 refers to the data size signal DS and the value of the RMW flag register 42 and outputs the read control signal OE or the write control signal WE. More specifically, if the value of the RMW flag register indicates validity and the data size signal DS shows a value other than a word, the read-write control circuit 41 outputs only the write control signal WE. If the value of the RMW flag register indicates invalidity and the data size signal DS shows a value other than a word, then the read-write control circuit 41 outputs the write control signal WE after outputting the read control signal OE. Furthermore, if the value of the data size signal DS shows a value indicating a word, then the read-write control circuit 41 outputs only the write control signal WE irrespective of the value of the RMW flag register.

The RMW flag register 42 stores the value of the RMW flag. The RMW flag is in a valid state if the read-modify-write signal RMW indicates that the read/modify write command is executed in the CPU 10. On the other hand, if the read-modify-write signal RMW indicates that a command other than the read/modify write command is executed in the CPU 10, the RMW flag is in an invalid state. Receiving the strobe signal STB and the read/write control signal RWC from the CPU 10, the RMW flag register 42 switches the state of the RMW flag.

The data select control circuit 43 outputs a selection signal to the data merge circuit 45 on the basis of the address signal ADD and the data size signal DS. The data merge circuit 45 performs merge processing of data on the basis of this selection signal to generate the write data WDb. The selection signal in this exemplary embodiment is configured by multiple signals. In this exemplary embodiment, the unit of the minimum data width of data outputted by the CPU 10 is 1-byte (8 bits), and the unit of the maximum data width is 1-word (32 bits). Therefore, the selection signal of this exemplary embodiment is configured by four selection signals. If the data size signal DS shows a value other than a word, then the data select control circuit 43 invalidates at least one selection signal corresponding to the address signal ADD (for example, a selection signal corresponding to the position of data specified by the address signal ADD). If the data size signal DS shows a value indicating a word, then the data select control circuit 43 validates all the selection signals.

The write data buffer 44 stores the write data WDa outputted by the CPU 10. In this exemplary embodiment, the write data buffer 44 is divided into multiple segments (WD1 to WD4 in FIG. 1), and each segment stores data of 1 byte (8 bits). In the example shown in FIG. 1, the segment WD1 stores data of the first to eighth bits of the write data WDa; the segment WD2 stores data of the ninth to sixteenth bits of the write data WDa; the segment WD3 stores data of the seventeenth to twenty-fourth bits of the write data WDa; and the segment WD4 stores data of the twenty-fourth to thirty-sixth bits of the write data WDa.

The read data buffer 46 stores the read data RDb corrected by the error detection-correction circuit 33. In this exemplary embodiment, the read data buffer 46 is divided into multiple segments (RD1 to RD4 in FIG. 1), and each segment stores data of 1 byte (8 bits). In the example shown in FIG. 1, the segment RD1 stores data of the first to eighth bits of the read data RDa; the segment RD2 stores data of the ninth to sixteenth bits of the read data RDa; the segment RD3 stores data of the seventeenth to twenty-fourth bits of the read data RDa; and the segment RD4 stores data of the twenty-fourth to thirty-sixth bits of the read data RDa.

The data merge circuit 45 has multiple selectors. The multiple selectors are provided being associated with the segments of the write data buffer 44 or the read data buffer 46, respectively. To each of the multiple selectors, one selection signal is inputted. Each selector selects data stored in the write data buffer 44 if the selection signal is valid, and selects data stored in the read data buffer 46 if the selection signal is invalid. The data merge circuit 45 performs merge processing of data with the data which has been selected by each elector on the basis of the selection signal to generate write data WDb.

Figure 2:
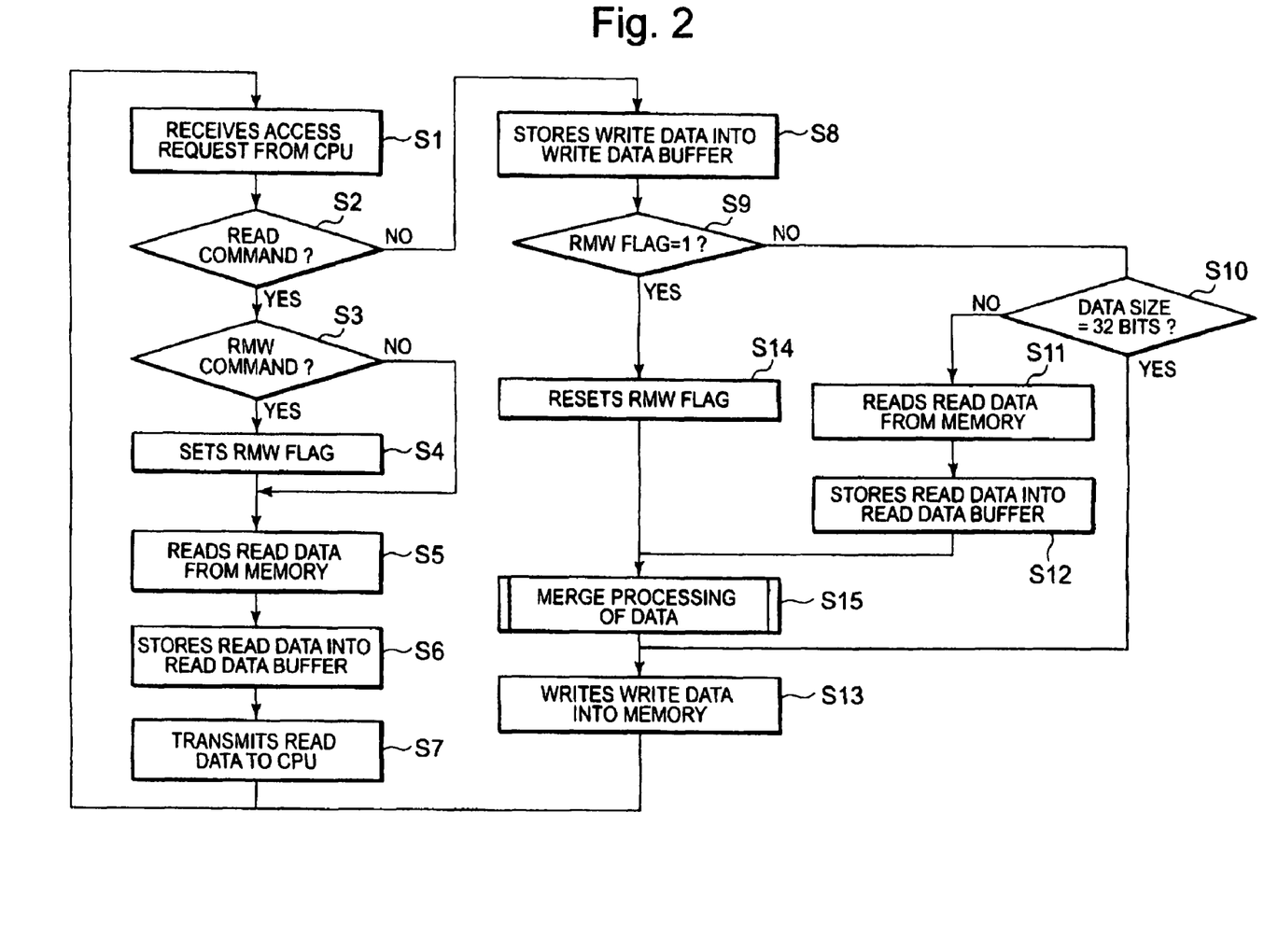
FIG. 2 is a diagram showing a flowchart showing the operation of a memory controller 30 according to the first exemplary embodiment.

Next, the operation of the memory controller 30 according to this exemplary embodiment will be described. FIG. 2 shows a flowchart showing the operation of the memory controller 30. It is assumed that the flowchart shown in FIG. 2 shows a state that a data processing apparatus 1 has been already activated.

As shown in FIG. 2, when receiving an access request (a signal such as the read/write control signal RWC) from the CPU 10, the memory controller 30 starts processing (step S1). By referring to the read/write control signal RWC in the access request, the memory controller 30 judges whether the request from the CPU 10 is a read operation or a write operation (step S2).

If the read/write control signal RWC is at a high level (in the reading instruction state) at step S2, then the memory controller 30 judges that the access request from the CPU 10 is a reading operation request (step S2: Yes). In this case, the memory controller 30 refers to the read-modify-write signal RMW and judges whether the command executed in the CPU 10 is the read-modify-write command or not (step S3). If the read-modify-write signal RMW is at a high level at step S3 (step S3: Yes), then the memory controller 30 sets the RMW flag (sets "1") (step S4). On the other hand, if the read-modify-write signal RMW is at a low level at step S3 (step S3: No), then the memory controller 30 proceeds to the next step without setting the RMW flag.

When the operation of step S3 or step S4 is completed, the memory controller 30 reads the read data RDa from the memory 20 (step S5). After that, error correction processing of the read data RDa is performed in the error detection-correction circuit 33. The read data RDb outputted from the error detection-correction circuit 33 is stored in the read data buffer 46 (step S6). The memory controller 30 transmits the read data RDb to the CPU 10 (step S7). When the processing of step S7 is completed, the memory controller 30 waits for an access request from the CPU 10 again.

On the other hand, if the read/write control signal RWC is at a low level (in the writing instruction state) at step S2, then the memory controller 30 judges that the access request from the CPU 10 is a writing operation request (step S2: No). In this case, the memory controller 30 stores the write data WDa outputted from the CPU 10 into the write data buffer 44 (step S8). Then, it is judged whether the value of the RMW flag is "1" or not (step S9) If the value of the RMW flag is judged to be "1" at step S9 (step S9: Yes), then the read-write control circuit 41 of the memory controller 30 outputs the write control signal WE for a writing operation to be subsequently performed. The memory controller 30 also resets the RMW flag (sets "0") (step S14). After that, the data select control circuit 43 of the memory controller 30 outputs a selection signal which specifies the position of data to be merged. Then, the data merge circuit 45 performs merge processing of the data on the basis of the selection signal (step S15). In this exemplary embodiment, it is assumed that, when the read-modify-write command is executed in the CPU 10 (for example, when the RMW flag is "1"), the CPU 10 outputs the write data WDa having a data width of 1 byte or a half word. Therefore, if the RMW flag is "1", then the merge processing of step S15 is performed. The data used in this merge processing of step S15 is the read data RDb read by the read operation (step S5) performed immediately after the processing of setting the RMW flag (step S4) and the write data WDa outputted from the CPU 10 after that. Therefore, if the RMW flag is "1" at step S9, then the memory controller 30 performs the merge processing of step S15 without performing a read operation after instruction of a write operation.

Figure 3:
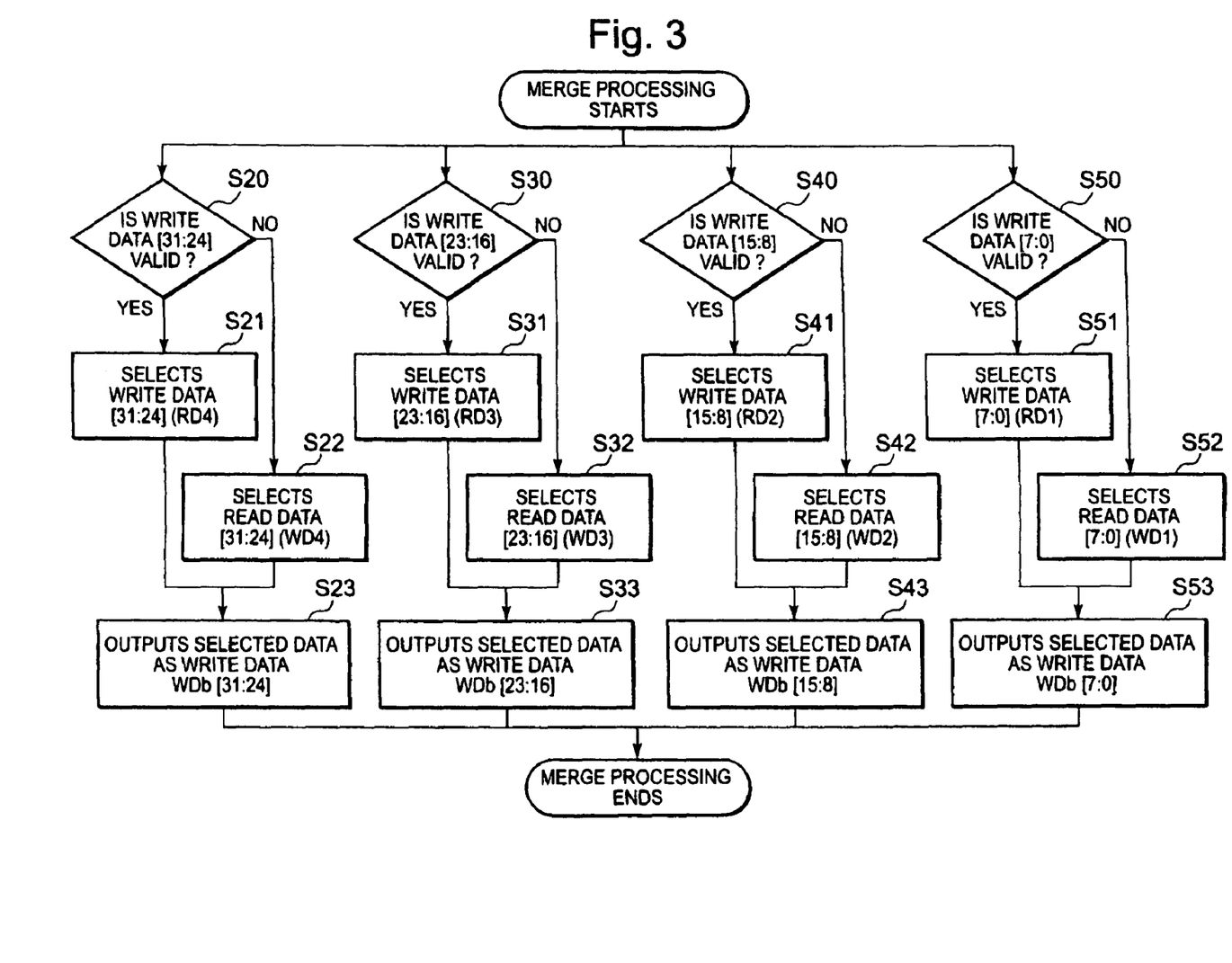
FIG. 3 is a flowchart showing the operation of merge processing in the memory controller 30 according to the first exemplary embodiment.

Here, the merge processing of step S15 will be described. FIG. 3 shows a flowchart showing a procedure for the merge processing. The memory controller 30 according to this exemplary embodiment stores 1-word data into the write data buffer 44 and the read data buffer 46 in bytes. Then, the data merge circuit 45 reads the data from the write data buffer 44 and the read data buffer 46 on a byte basis, and selects whether to use write data or read data on a byte basis to perform merge processing of the data. In this case, the data merge circuit 45 performs the merge processing by causing the selectors provided on a byte basis to operate in parallel. Therefore, in the merge processing shown in FIG. 3, step 620 to step S23, step S30 to step S33, step S40 to step S43, and step S50 to step S53 for performing merging for 1 byte, are executed in parallel. Step S20 to step S23 are merge processing for data of the twenty-fifth to thirty-second bits of the write data; step S30 to step S33 are merge processing for data of the seventeenth to twenty-fourth bits of the write data; step S40 to step S43 are merge processing for data of the ninth to sixteenth bits of the write data; and step S50 to step S53 are merge processing for data of the first to eighth bits of the write data.

Since the operations of step S20 to step S23, step S30 to step S33, step S40 to step S43, and step S50 to step S53 are substantially the same, the merge processing will be described with steps S20 to S23 as an example here.

First, the data merge circuit 45 judges whether the write data is valid or not at step S20. Specifically, at step S20, the validity of the write data is judged by judging a selection signal inputted to the selector corresponding to the write data of the twenty-fifth to thirty-second bits is in a valid state or an invalid state. If it is judged at step S20 that the write data is valid at step S20 (step S20: Yes), then the selector selects write data stored in the write data buffer 44 and outputs it at step S21. On the other hand, if it is judged at step S20 that the write data is invalid (step S20: No), then the selector selects read data stored in the read data buffer 46 and outputs it at step S22. Then, the data merge circuit 45 outputs the data selected at step S21 or step S22 as the data of the twenty-fifth to thirty-second bits of the write data WDb. In the data merge circuit 45, the write data which has been merge-processed on a byte basis in this way is then synthesized and becomes the write data WDb (32-bit (1-word) data) to be written into the memory 20.

When the above-described merge processing of step S14 is completed, the memory controller 30 writes the write data WDb into the memory 20 together with an error correcting code ECC generated by the correcting code generation circuit 32 (step S13). After the processing of step S13 is completed, the memory controller 30 waits for an access request from the CPU 10 again.

If the value of the RMW flag is judged to be "0" at step S9 in FIG. 2 (step S9: No), then the read-write control circuit 41 of the memory controller 30 refers to the data size signal DS and judges whether the data size signal DS indicates a word (32 bits) or not (step S10). If the value of the data size signal DS indicates a word at step S10 (step S10: Yes), then the read-write control circuit 41 outputs the write control signal WE. Then, without performing the merge processing (step S15) of the write data WDa outputted from the CPU 10, the memory controller 30 immediately writes the write data WDa into the memory 20 as the write data WDb (step S13). In this case also, an error correcting code ECC is generated together with the write data WDb, and the write data WDb and the error correcting code ECC are written into the memory 20. After the processing of step S13 is completed, the memory controller 30 waits for an access request from the CPU 10 again.

On the other hand, if the data size signal DS indicates a data size other than a word at step S10 (step S10: No), then the read-write control circuit 41 outputs the read control signal OE. Then, the memory controller 30 reads the read data from the memory 20 (step S1). The read data read at step S11 is stored into the read data buffer 46 (step S12). After that, the data merge circuit 45 of the memory controller 30 performs merge processing of the read data RDb stored into the read data buffer 46 at step S12 and the write data WDa stored into the write data buffer 44 at step S8 to generate the write data WDb (step S15). Then, the memory controller 30 writes the write data WDb generated at step S15 into the memory 20 (step S13). In this case also, an error correcting code ECC is generated together with the write data WDb, and the write data WDb and the error correcting code ECC are written into the memory 20. After the processing of step S13 is completed, the memory controller 30 waits for an access request from the CPU 10 again.

Next, the operation of the memory controller 30 in accordance with the flow shown in FIG. 2 will be described with the use of a timing chart. First, FIG. 4 shows the timing chart of the memory controller 30 in the case where the CPU 10 performs a simple read operation (steps S1, S2, S3, S5, S6 and S7 in FIG. 2) and a simple write operation (steps S1, S2, S8, S9, S10, and S13 in FIG. 2).

Figure 4:
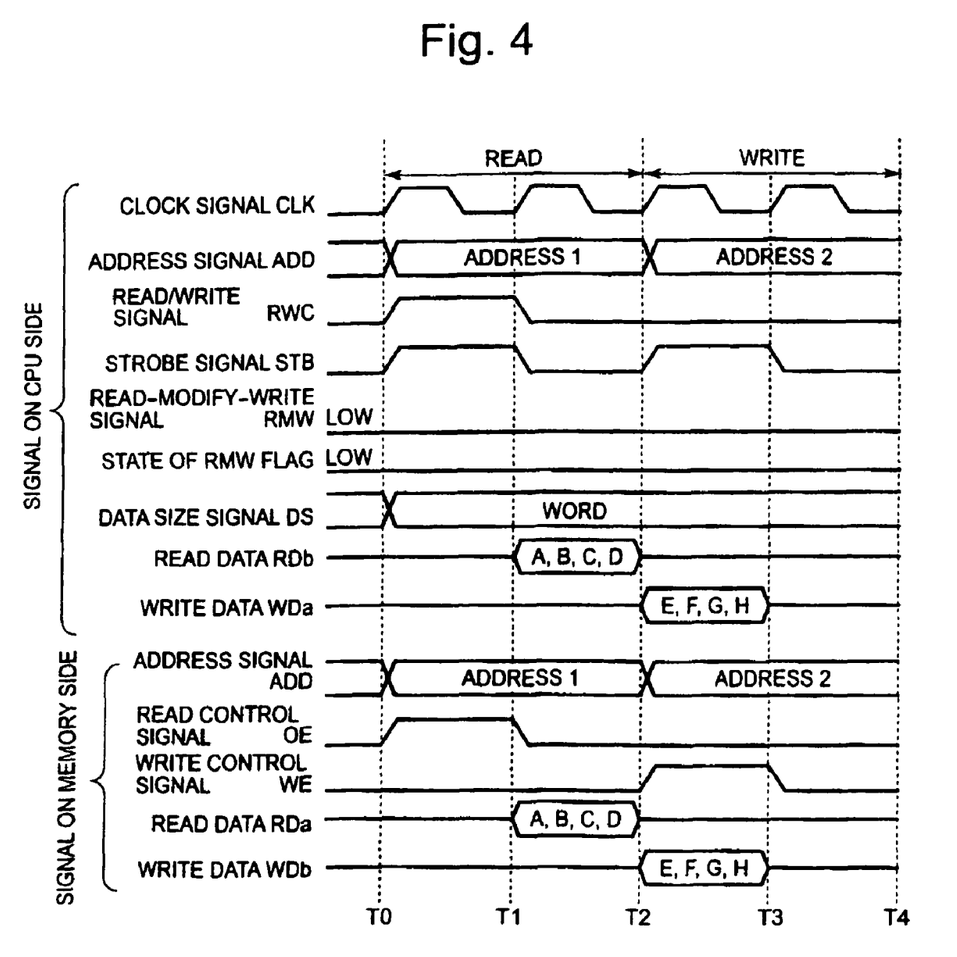
FIG. 4 is a timing chart showing the operation of the memory controller 30 in the case where a read operation and a write operation for 1-word data are performed in the data processing apparatus according to the first exemplary embodiment.

In the example shown in FIG. 4, it is assumed that a read operation based on a reading instruction from the CPU 10 is performed in the section between timings T0 and T2, and a write operation based on a writing instruction from the CPU 10 is performed in the section between timings T2 and T4. In the example shown in FIG. 4, it is assumed that the clock signal CLK is kept being outputted while the CPU 10 accesses the memory 20. Furthermore, in the example shown in FIG. 4, since the commands executed in the CPU 10 are simple read and write commands, the read-modify-write signal RMW and the RMW flag keep a low level (for example, "0"). Furthermore, the data size signal DS is assumed to keep a value indicating a word, between the timings T0 and T4.

First, at the timing T0 when the read operation is started, the read/write control signal RWC outputted from the CPU 10 changes from a low level to a high level, and gives a reading instruction to the memory controller 30. The CPU 10 outputs an address 1 as an access target address at the timing T0. Furthermore, the CPU 10 sets the strobe signal STB at a high level when starting access at the timing T0. Then, the memory controller 30 which has received the signal from the CPU 10 sets the read control signal OE at a high level on the basis of the values of the read/write control signal RWC, the RMW flag and the data signal DS.

Then, at the timing T1, the memory controller 30 receives data targeted by reading, from the memory 20 as the read data RDa (the values of the bytes are denoted by A, B, C and D, respectively, in FIG. 4). After that, the memory controller 30 performs error correction processing of the read data RDa and transmits the data after correction to the CPU 10 as the read data RDb. At the timing T1, the read/write control signal RWC and the strobe signal STB fall and become a low level.

Next, at the timing T2 when the write operation is started, the CPU 10 raises the strobe signal STB while keeping the read/write control signal RWC at a low level. Thereby, the CPU 10 gives a writing instruction to the memory controller 30. The CPU 10 also outputs an address 2 as an access target address at the timing T2. Furthermore, the CPU 10 sets the strobe signal STB at a high level when starting access at the timing T2. Then, the memory controller 30 which has received the signal from the CPU 10 sets the write control signal WE at a high level on the basis of the values of the read/write control signal RWC, the RMW flag and the data signal DS. The memory controller 30 receives the write data WDa received from the CPU 10 (the values of the bytes are denoted by E, F, G and H, respectively, in FIG. 4). Then, the memory controller 30 outputs the same data as the received write data WDa as the write data WDb and writes it into the memory 20. During the period between the timings T3 and T4, which is the period for the write operation, the operation of the memory controller 30 is not especially performed.

Figure 5:
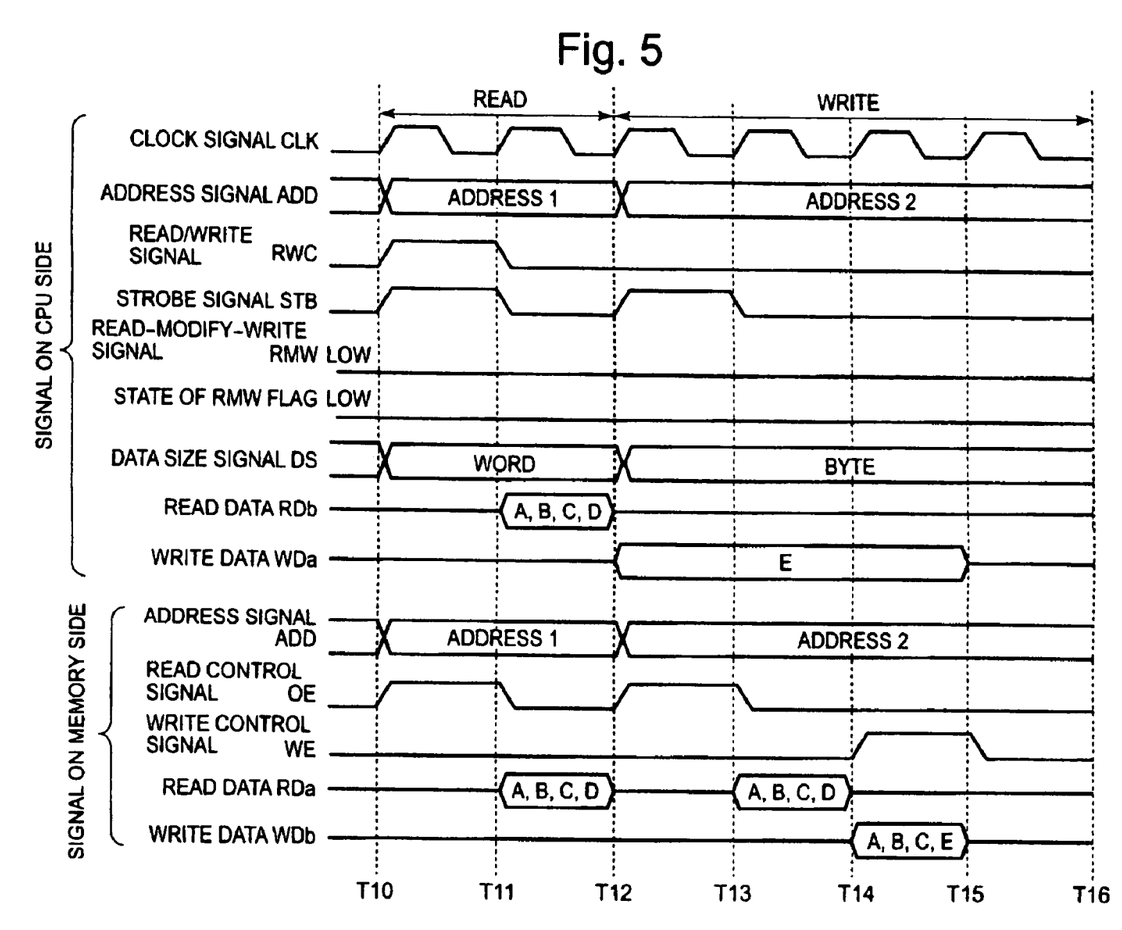
FIG. 5 is a timing chart showing the operation of the memory controller in the case where a read operation for 1-word data and a write operation for partial data are performed in the data processing apparatus according to the first exemplary embodiment.

Next, FIG. 5 shows the timing chart of the memory controller 30 in the case where the CPU 10 performs a simple read operation (steps S1, S2, S3, S5, S6 and S7 in FIG. 2) and a 1-byte data write operation (steps S1, S2, S8, S9, S10, S1, S12, S15, S13 and S14 in FIG. 2). Since the read operation in FIG. 5 is substantially the same as the read operation shown in FIG. 4, description thereof is omitted.

In the example shown in FIG. 5, it is assumed that a read operation based on a reading instruction from the CPU 10 is performed in the section between timings T10 and T12, and a write operation based on a writing instruction from the CPU 10 is performed in the section between timings T12 and T16. In the example shown in FIG. 5, it is assumed that the clock signal CLK is kept being outputted while the CPU 10 accesses the memory 20. In the example shown in FIG. 5, since the commands executed in the CPU 10 are the read command and the write command, the read-modify-write signal RMW and the RMW flag keep a low level (for example, "0"). Furthermore, the data size signal DS is assumed to keep a value indicating a word, between the timings T10 and T12 and keep a value indicating a byte, between the timings T12 and T16.

In the write operation shown in FIG. 5, at the timing T12 when the write operation is started, the CPU 10 raises the strobe signal while keeping the read/write control signal RWC at a low level. Thereby, the CPU 10 gives a writing instruction to the memory controller 30. The CPU 10 also outputs an address 2 as an access target address at the timing T12.

Then, in the case of writing the 1-byte data shown in FIG. 5, the memory controller 30 which has received the signal from the CPU 10 at the timing T12 sets the read control signal OE at a high level. Then, at the timing T13, the read data RDa stored at the address 2 is read. The data read at the timing T13 is stored into the read data buffer 46.

After that, at the timing T14, the memory controller 30 sets the write control signal WE at a high level. On the basis of the 1-byte write data WDa (denoted by E in FIG. 5) outputted from the CPU 10 and the read data RDa read at the timing T13, the memory controller 30 generates write data WDb which includes the data E. Then, the write data WDb which includes the data E is written into the memory 20. In the example shown in FIG. 5, the CPU 10 keeps the state of outputting the write data WDa during the period between the timings T12 and T15 in the write operation, and this is realized by the memory controller 30 outputting a wait signal (not shown) to the CPU 10. During the period between the timings T15 and T16, which is the period for the write operation, the operation of the memory controller 30 is not especially performed.

Figure 6:
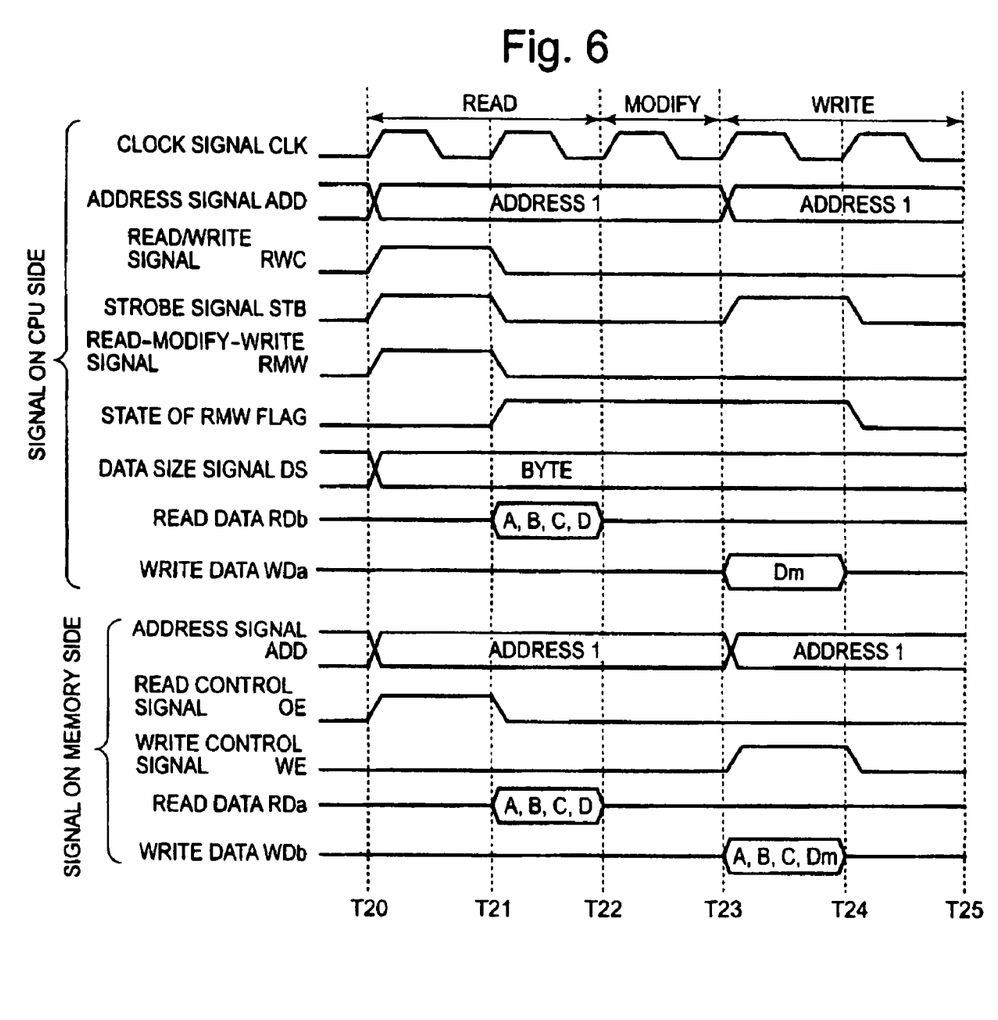
FIG. 6 is a timing chart showing the operation of the memory controller 30 in the case where a read operation and a write operation which are based on a read-modify-write command are performed in the data processing apparatus according to the first exemplary embodiment.

Next. FIG. 6 shows the timing chart of the memory controller 30 in the case where the CPU 10 executes the read-modify-write command (the processings at steps S1, S2, S3, S4, S5, S6, S7, S1, S2, S8, S9, S14, S15, and S13 in FIG. 2 are performed). When the read-modify-write command is executed in the CPU 10, the CPU 10 performs a read operation and a write operation as a series of operations in response to one command. In this case also, the read operation is substantially the same as the read operation shown in FIG. 4, and therefore, description thereof is omitted.

In the example shown in FIG. 6, it is assumed that a read operation based on the read-modify-write command is performed in the section between timings T20 and T22, a modify operation based on the read-modify-write command is performed in the section between timings T22 and T23, and a write operation based on the read-modify-write command is performed in the section between timings T23 and T25. In the example shown in FIG. 6, it is assumed that the clock signal CLK is kept being outputted while the CPU 10 accesses the memory 20. Furthermore, in the example shown in FIG. 6, at the timing T20 when the operation based on the read-modify-write command is started, the read-modify-write signal RMW becomes a high level. Then, in synchronization with the fall of the strobe signal STB at the timing T21, the read-modify-write signal RMW is latched, and the RMW flag becomes high level (for example, "1"). The RMW flag is returned to "0" in synchronization with the fall (the timing T24) of the strobe signal indicating the start of the write operation based on a write command based on the read-modify-write command. Furthermore, the read-modify-write command in this exemplary embodiment is assumed to modify 1-byte data and write it back. Therefore, the data size signal DS is assumed to keep a value indicating a byte, between the timings T20 and T25.

In the example shown in FIG. 6, the read operation based on the read-modify-write command is completed at the timing T22. Then, during the period between the timings T22 and T23, the CPU 10 modifies data corresponding to 1 byte (for example, data D) in the read data RDb which has been read to generate data Dm.

After that, a write operation based on the read-modify-write command is started at the timing T23. In the write operation shown in FIG. 6, at the timing T22 when the write operation is started, the CPU 10 raises the strobe signal STB while keeping the read/write control signal RWC at a low level. Thereby, the CPU 10 gives (e.g., provides) a writing instruction to the memory controller 30. The CPU 10 also outputs the same address 1 as at the timings T20 to T22, as an access target address at the timing T22.

Since the RMW flag is at a high level, the memory controller 30 outputs not the read control signal OE, but the write control signal WE even if the data size signal DS shows a value indicating a byte. Furthermore, the memory controller 30 generates write data WDb (denoted by A, B, C and Dm in FIG. 6) obtained by replacing the data D in the read data RDb read from the memory at the timings T21 to T22 with the write data WDa. Then, the memory controller 30 writes the write data WDb which includes the data Dm, into the memory 20. During the period between the timings T24 and T25, which is the period for the write operation, the operation of the memory controller 30 is not especially performed.

As described above, when the CPU 10 executes the read-modify-write command, the CPU 10 performs an operation of writing data after correction back to the address from which read data has been read. In such a case, the memory controller 30 according to this exemplary embodiment can judge whether or not a read operation performed before a write operation has been performed on the basis of the read-modify-write command, from the RMW flag. Then, if the RMW flag is valid, the memory controller 30 generates write data WDb which includes the write data WDa after correction without performing a read operation in the write operation based on the read-modify-write command.

Thereby, even if the read-modify-write command is executed in the CPU 10 and an operation of writing partial data having a data width (for example, 8 bits (1 byte) or 16 bits (half word)) smaller than a predetermined data width (for example, 32 bits (1 word)) occurs, the memory controller 30 according to this exemplary embodiment can write the write data WDb with a 1-word data width and including the partial data, which is writing target data, into the memory, without performing a read operation in the write operation for the partial data. That is, the memory controller 30 according to this exemplary embodiment can speed up the write operation based on the read-modify-write command and improve the throughput of the data processing apparatus. In the case where the frequency of the read-modify-write command being executed is high in a data processing apparatus, the advantage of speedup obtained by implementing the memory controller 30 according to this exemplary embodiment is further remarkable.

Furthermore, in the memory controller 30 according to this exemplary embodiment, when writing of partial data occurs, which is not due to the read-modify-write command (for example, the operation between the timings T12 and T16 in FIG. 5), the read-write control circuit 41 performs a read operation and a write operation on the basis of the data size signal DS. That is, in such a case, the memory controller 30 first outputs the read control signal OE to read first read data, replaces an appropriate part of the first read data with the partial data, and generates write data WDb with a data width of 1 word which includes the partial data. Then, the memory controller 30 writes the write data WDb having a data width of 1 word and including the partial data into the memory 20. Thereby, even in the case where an operation of writing partial data occurs on the basis of a command other than the read-modify-write command, the memory controller 30 can write the write data WDb with a data width of 1 word which includes the partial data, into the memory 20.

In the memory controller 30 according to this exemplary embodiment, the write data WDb which includes partial data is written into the memory 20 irrespective of whether or not the operation of writing the partial data is based on the read-modify-write command. Therefore, the memory controller 30 can generate an error correcting code ECC for 1-word write data WDb irrespective of the data width of data targeted by writing. Thus, the memory controller 30 can reduce the data size of generated error correcting codes ECC to be smaller than when an error correcting code ECC is generated for each byte. Furthermore, since the data amount of the error correcting code ECC is small, the data processing apparatus 1 can efficiently store data required by the CPU 10 into the memory 20 without pressure on the storage capacity of the memory 20 by the error correcting codes ECC.

Further, the method for judging whether or not the command executed in the CPU 10 is the read-modify-write command can be realized by a method in which an address signal ADD corresponding to a write operation and an address signal ADD outputted in an operation prior to the write operation are compared, in addition to the method using the RMW flag. That is, in order to realize the access method according to the present invention, it is sufficient if the memory controller 30 can judge whether the read-modify-write command has been executed in the CPU 10, and the judgment method can be changed appropriately according to the system of the data processing apparatus.

Although the invention has been described above in connection with the exemplary embodiment thereof, it will be appreciated by those skilled in the art that this exemplary embodiment is provided solely for illustrating the invention, and should not be relied upon to construe the appended claims in a limiting sense.

Further, it is noted that, notwithstanding any claim amendments made hereafter, applicants' intent is to encompass equivalents all claim elements, even if amended later during prosecution.

What is claimed is:

1. A data processing apparatus, comprising:
a memory which receives, and outputs data with a predetermined data width;
an operation circuit which outputs a read command or a write command to access the memory; and
an access control circuit which replaces a part of first read data read from the memory with a partial data, different from the first read data, and outputs partially replaced data as write data to the memory when receiving the write command and the partial data with a data width smaller than the predetermined data width associated with the write command, from the operation circuit,
wherein the access control circuit replaces a part of second read data which has been acquired in response to the read command outputted previously, instead of the first read data, with the partial data, and outputs partially replaced data as the write data if the write command has been outputted in connection with a read command outputted before the write command.

2. The data processing apparatus according to claim 1, wherein the operation circuit executes a read-modify-write command reading the first read data from the memory, modifying a part of the first read data to generate the partial data, and writing the generated partial data to the memory.

3. The data processing apparatus according to claim 2, wherein the access control circuit comprises:
an RMW (read-modify-write) flag register which stores a flag value; and
a read-write control circuit which outputs a read control signal instructing a reading operation, and a write control signal instructing a writing operation, to the memory, wherein the operation circuit outputs a read-modify-write signal together with the read command when execution of the read-modify-write command is started, and outputs a data size signal indicating the data width of data to be stored which is outputted to the access control circuit, with the write command,
wherein the RMW flag register receives the read-modify-write signal, and causes the flag value to be valid, and
wherein the read-write control circuit outputs the write control signal without outputting the read control signal in response to the write command if the data size signal shows a value smaller than the predetermined data width and the flag value is valid when receiving the write command.

4. The data processing apparatus according to claim 3, wherein the read-write control circuit outputs the read control signal in response to the write command, and then outputs the write control signal if the data size signal shows the value smaller than the predetermined data width and the flag value is invalid when receiving the write command.

5. The data processing apparatus according to claim 1, wherein the access control circuit comprises:

a data select control circuit which receives an address signal outputted by the operation circuit and a data size signal indicating the data width of data to be stored which is outputted to the access control circuit at a time of the operation circuit outputting the write command to output a selection signal indicating a data position targeted by data merge processing;

a read data buffer which stores the first read data;

a write data buffer which stores the partial data or the data to be stored; and a data merge circuit which merges data read from the read data buffer and data read from the write data buffer based on the selection signal to generate the write data.

6. The data processing apparatus according to claim 5, wherein stored data stored by a stored data width defined by the data width smaller than the predetermined data width is divided in each of the read data buffer and the write data buffer, and wherein input/output of data in each of the read data buffer and the write data buffer are performed in units of the divided data.

7. The data processing apparatus according to claim 6, wherein the data merge circuit selects the data of the write data buffer as the write data corresponding to a part of the selection signal showing a valid state, and selects the data of the read data buffer as the write data corresponding to a part of the selection signal showing an invalid state.

8. The data processing apparatus according to claim 1, further comprising:

an error correction circuit which generates an error correcting code for an entirety of the write data, and outputs the write data and the error correcting code to the memory; and an error detection-correction circuit which performs error correction for a third read data with use of the error correcting code read in association with the third read data read from the memory, and generates the first read data to be transmitted to the operation circuit.

9. A memory controller which controls access to a memory when receiving a read command or a write command outputted from an operation circuit, the memory controller comprising:

an access control circuit which outputs write data to the memory, based on read data acquired from the memory in response to the read command received immediately before the write command and partial data, different from the read data, outputted from the operation circuit in response to the write command, when detecting that the write command comprises a command based on the read command received immediately before the write command; and an error correction circuit which generates an error correcting code for an entirety of the write data and outputs the write data and the error correcting code to the memory, wherein the access control circuit replaces a part of the read data, acquired from the memory in response to the read command received immediately before the write command, with the partial data, and outputs partially replaced data as the write data if the access control circuit detects that the write command comprises the command based on the read command received immediately before the write command.

10. The memory controller according to claim 9, wherein the partial data has a data width smaller than the data width of a data bus which connects the operation circuit and the memory.

11. The memory controller according to claim 10, wherein the operation circuit executes a read-modify-write command reading the read data from the memory, modifying the part of the read data to generate the partial data, and writing the generated partial data to the memory.

12. The memory controller according to claim 10, wherein the access control circuit outputs a read control signal instructing a reading operation to the memory on a basis of the write command, reads the read data from the memory, and generates the write data by replacing the part of the read data with the partial data if the access control unit detects that the write command comprises a command independent from the read command received immediately before the write command and receiving the partial data together with the write command.

13. The memory controller according to claim 10, wherein the access control circuit comprises:

an RMW (read-modify-write) flag register which stores a flag value; and a read-write control circuit which outputs a read control signal instructing a reading operation, and a write control signal instructing a writing operation, to the memory, wherein the operation circuit outputs a read-modify-write signal together with the read command when execution of the read-modify-write command is started, and outputs a data size signal indicating the data width of data to be stored which is outputted to the access control circuit, with the write command, wherein the RMW flag register receives the read-modify-write signal, and causes the flag value to be valid, and wherein the read-write control circuit outputs the write control signal without outputting the read control signal in response to the write command if the data size signal shows a value smaller than a predetermined data width and the flag value is valid when receiving the write command.

14. The memory controller according to claim 13, wherein the read-write control circuit outputs the read control signal in response to the write command, and outputs the write control signal if the data size signal shows the value smaller than the predetermined data width and the flag value is invalid when receiving the write command.

15. The memory controller according to claim 10, wherein the access control circuit comprises:

a data select control circuit which receives an address signal outputted by the operation circuit and a data size signal indicating the data width of the data to be stored to output a selection signal indicating a data position targeted by data merge processing;

a read data buffer which stores the read data;

a write data buffer which stores the partial data or the data to be stored; and a data merge circuit which merges data read from the read data buffer and data read from the write data buffer based on the selection signal, to generate the write data.

16. The memory controller according to claim 15, wherein stored data stored by a stored data width defined by a data width smaller than a predetermined data width is divided in each of the read data buffer and the write data buffer, wherein input/output of data in each of the read data buffer and the write data buffer is performed in units of the divided data.

17. The memory controller according to claim 16, wherein the data merge circuit selects the data of the write data buffer as the write data corresponding to apart of the selection signal showing a valid state, and selects the data of the read data buffer as the write data corresponding to a part of the selection signal showing an invalid state.

18. An access control method controlling access between an operation circuit and a memory which receives access from the operation circuit, the access control method comprising:
> transmitting read data read from the memory in response to a read command outputted from the operation circuit to the operation circuit;
> receiving a write command and data, different from the read data, obtained by changing a part of the read data outputted from the operation circuit as partial data;
> detecting that the write command comprises a command outputted in response to the read command outputted immediately before; and
> generating write data to the memory based on the read data read in response to the read command outputted immediately before the write command and the partial data.

19. The access control method according to claim 18, wherein the partial data has a data width smaller than the data width of a data bus between the operation circuit and the memory, and wherein the write data is generated by replacing the part of the read data with the partial data.

20. The access control method according to claim 18, further comprising:
> when a write command independent from other commands and the partial data are received from the operation circuit:
> > detecting that the write command comprises a command independent from the read command outputted immediately before;
> > reading read data from the memory in response to the write command; and generating the write data by replacing a part of the read data with the partial data.

* * * * *